Feb. 27, 1968  B. M. FINGERUT ET AL  3,370,722
CHAFF AND STRAW COLLECTING AND SEPARATING
MEANS FOR HARVESTER COMBINE
Filed April 14, 1966  2 Sheets-Sheet 1

INVENTORS.
BORIS M. FINGERUT
FRED E. KIRBY
BY *T. R. Geisler*
ATTORNEY

Feb. 27, 1968   B. M. FINGERUT ET AL   3,370,722
CHAFF AND STRAW COLLECTING AND SEPARATING
MEANS FOR HARVESTER COMBINE
Filed April 14, 1966   2 Sheets-Sheet 2
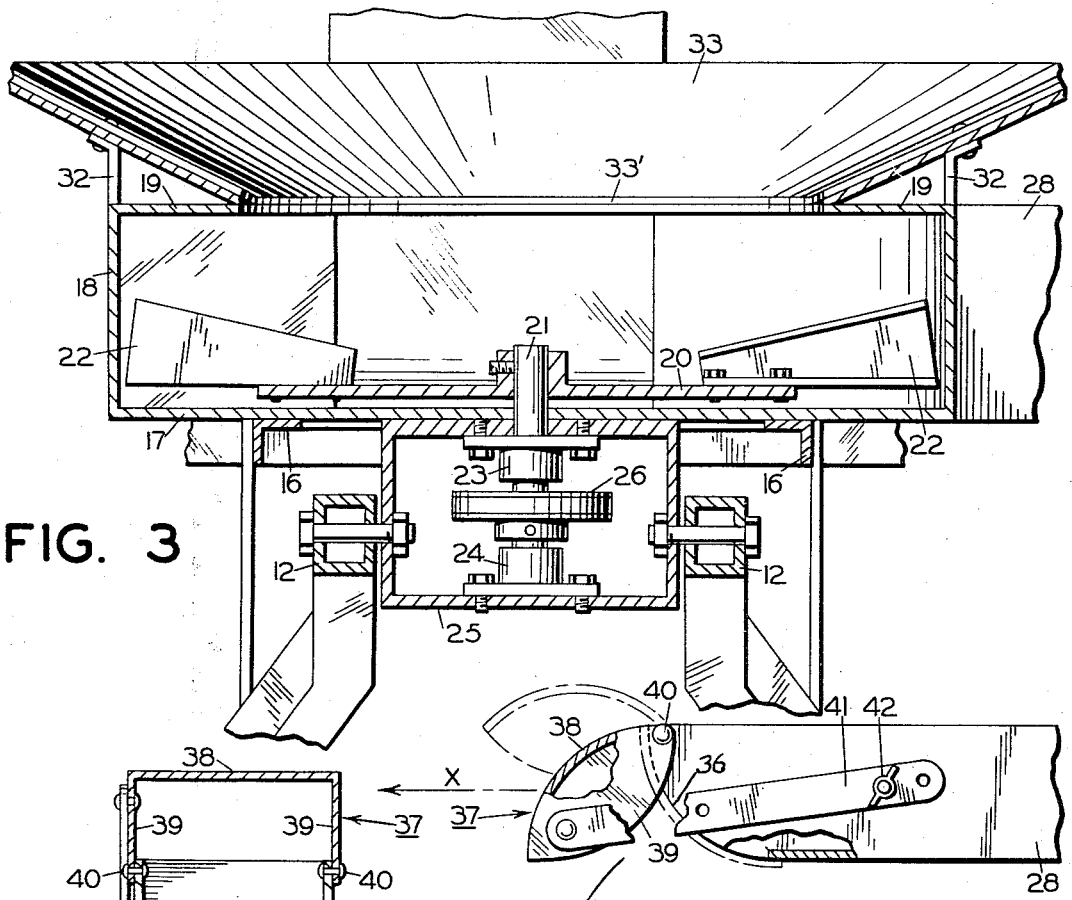
FIG. 3
FIG. 5
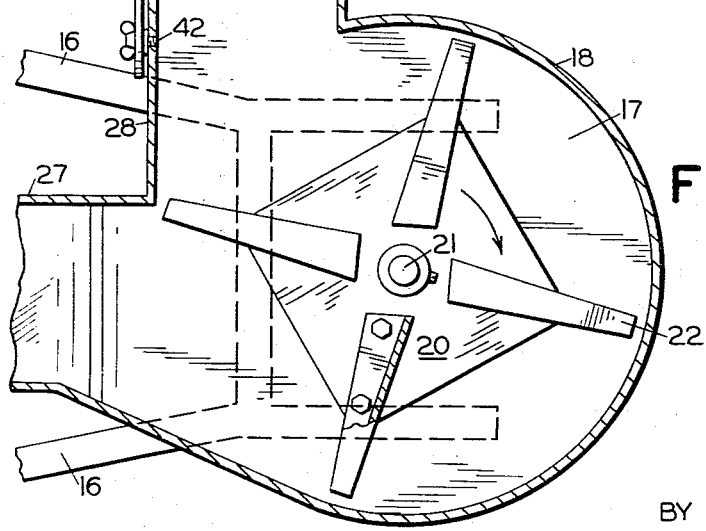
FIG. 4
INVENTORS.
BORIS M. FINGERUT
FRED E. KIRBY
BY
ATTORNEY

United States Patent Office 3,370,722
Patented Feb. 27, 1968

3,370,722
CHAFF AND STRAW COLLECTING AND SEPARATING MEANS FOR HARVESTER COMBINE
Boris M. Fingerut, Lake Grove, and Fred E. Kirby, Madras, Oreg., assignors to Portland Wire & Iron Works, Portland, Oreg., a corporation of Oregon
Filed Apr. 14, 1966, Ser. No. 542,499
5 Claims. (Cl. 214—42)

This invention, like that described in the pending application of Boris M. Fingerut, Ser. No. 391,447, filed August 24, 1965, now Patent No. 3,317,064, entitled "Self-Contained Forage Wagon Assembly for Harvester Combine," relates to the disposition of chaff and straw discharged from a harvester combine, and the present invention is concerned with a modification of and improvement in a portion of the assembly described in said pending application.

The object of the present invention is to provide novel and improved means for handling the chaff and straw as these are discharged from the harvester combine.

More specifically, an object of the invention is to provide novel means whereby the straw may be divided from the chaff as both are discharged from the harvester combine, whenever such division is desired, with separate disposition then made of each.

A related object is to provide novel and adjustable means for disposing of the straw whenever separation of the straw from the chaff is carried out.

Another specific object is to provide a very simple and practical blower and blower housing assembly through the medium of which such separation of straw and chaff, with separate disposition of each, may easily be accomplished when desired.

The means by which and the manner in which these objects are accomplished with the present invention will be briefly described and explained with reference to the accompanying drawings, wherein:

FIG. 3 is a sectional elevation on line 3—3 of FIG. 1, drawn to a larger scale;

Figure 1:
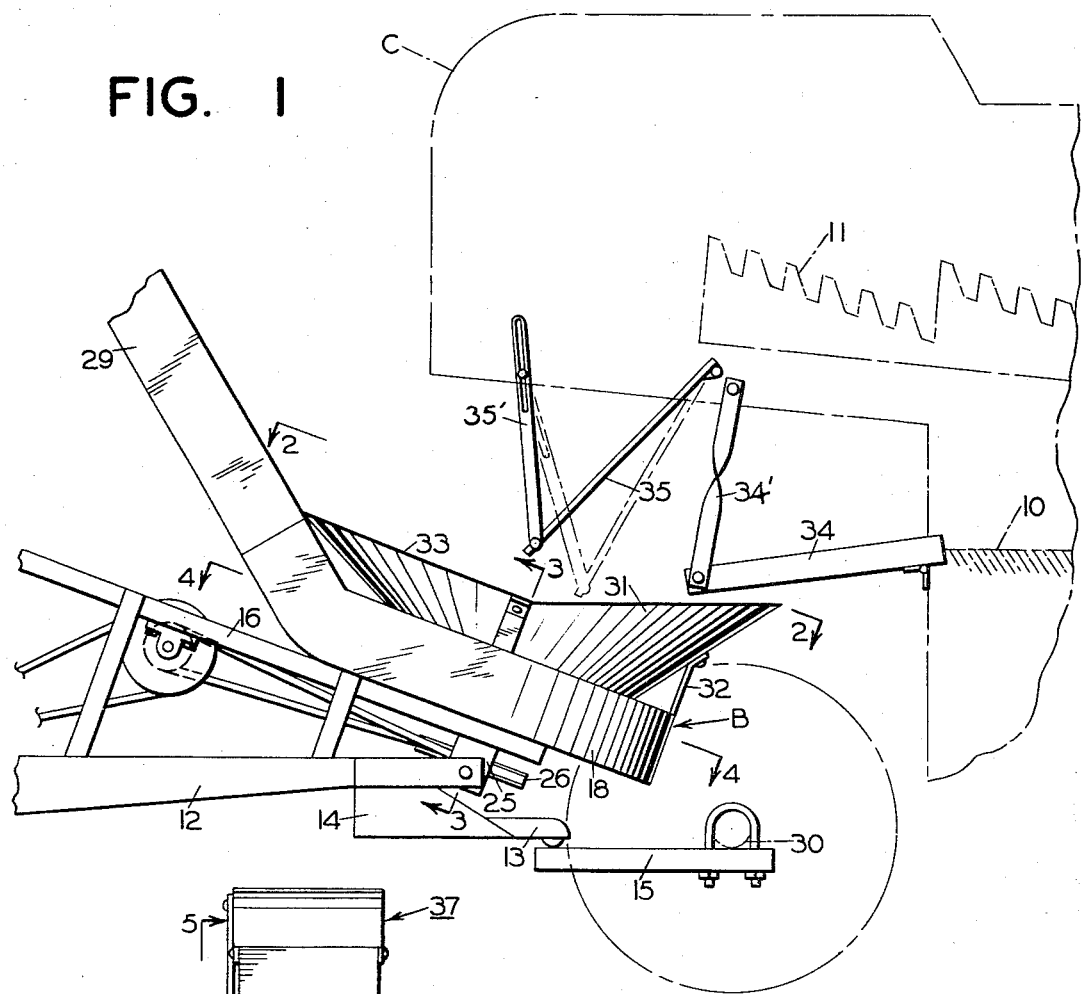
FIG. 1 is a fragmentary side elevation showing, in broken lines, the rear portion of a harvester combine, and, in whole lines, the front portion of a forage wagon assembly with the improved means for collecting and disposing of the chaff and straw in place on the forage wagon.
Figure 2:
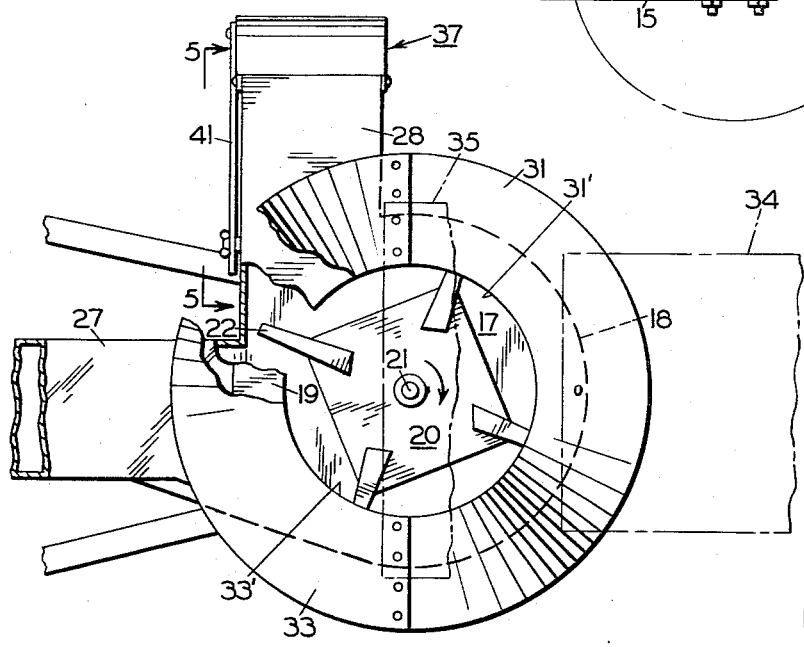
FIG. 2 is a fragmentary plan view taken on line 2—2 of FIG. 1, with a portion of the blower housing broken away for clarity.

FIG. 4 is a section on line 4—4 of FIG. 1, drawn to a larger scale than FIG. 1, though to a smaller scale than FIG. 3; and FIG. 5 is a fragmentary sectional elevation on line 5—5 of FIG. 2, drawn to a larger scale, with portions broken away for clarity, showing the control and directional shutter for the discharge of the straw in full lines in partly open position, and in broken lines in fully open and fully closed positions.

In FIG. 1 the rear portion of a conventional harvester combine is shown in broken lines. The customary chaff discharge pan in the harvester combine is indicated at 10, and the discharging "walker" for the straw is indicated at 11, the "walker" for the straw being located above and extending further to the rear of the harvester combine than the discharge pan for the chaff, as is customary.

A forage wagon assembly, only the front portion of which is shown in FIG. 1, but which is similar to that described in the previously mentioned pending application, Ser. No. 391,447, is attached to the harvester combine. The forage wagon assembly includes a triangular main frame 12, having a pair of side frame members which converge towards the front end of the frame. A hitch member 13 is rigidly secured to the front end of the forage wagon main frame by a pair of plates, one of which is shown at 14. The hitch member 13 contains a socket for a ball mounted on the end of a companion hitch member 15 which is rigidly clamped to the rear axle 30 of the harvester combine.

The means for collecting and disposing of the chaff and straw, as these materials are discharged from the harvester combine, include a special blower assembly indicated in general by the reference character B in FIG. 1. The blower assembly is mounted on an open frame 16, which is secured on the forward portion of the main frame 12 of the forage wagon in the location shown in FIG. 1.

The blower assembly includes a housing having a bottom wall 17 (FIGS. 3 and 4) a side wall 18, and a top wall 19, a portion of the latter being shown in FIG. 3. The top wall 19 has a circular central opening which forms the entrance into the blower. The bottom wall of the blower housing extends in an inclined plane as apparent from FIG. 1.

The impeller in the blower includes a bottom plate 20 (FIG. 3) secured on the impeller shaft 21. Suitable blades 22 are mounted on the plate 20. The impeller shaft 21 is mounted in bearings 23 and 24, carried in a lower housing 25, which is secured to the side members of the main frame 12 of the forage wagon as well as to the frame 16 and to the bottom of the blower housing. A pulley 26, secured on the impeller shaft 21, as driven through suitable belt connections from a motor (not shown) carried by the forage wagon assembly.

A pair of covered passageways 27 and 28 (FIGS. 2 and 4) lead from the rear half of the blower housing substantially at right angles to each other. The side wall 18 of the blower housing, the front portion of which is substantially semi-cylindrical, joins an outer side wall on each of the covered passageways 27 and 28, as shown in FIG. 4. The bottom wall 17 of the blower housing merges into the bottom walls of the passageways 27 and 28, as shown, and similarly the open top wall 19 of the blower housing merges into the top walls of these passageways. The covered passageway 27 leads rearwardly and upwardly to a covered chute 29 which discharges into the collecting bin (not shown) on the forage wagon. The covered passageway 28 leads laterally off to one side and, when not closed in the manner later described, discharges the material passing through that passageway onto the ground.

A front, partially funnel-shaped guideway 31 (FIGS. 1 and 2) hereinafter referred to as the chaff funnel, has a smaller, inner rim 31' extending along the corresponding front half of the circular inside rim of the top wall 19 of the blower housing. A rear, partially funnel-shaped companion guideway 33 (FIGS. 1, 2 and 3), the ends of which join the adjacent ends of the front guideway 31, has a smaller rim 33' extending along the remaining or rear half of the circular inside rim of the top wall 19 of the blower housing. This rear guideway is hereinafter referred to as the straw funnel. Suitable brackets 32, extending up from the blower housing, aid in supporting the chaff funnel 31 and the companion straw funnel 33 rigidly in place on the blower assembly.

To aid in conducting the chaff from the chaff discharge pan 10 (FIG. 1) of the harvester combine into the chaff funnel 31 of the blower assembly an extension 34 is attached by suitable means to the end of the discharge pan 10 and the outer or rear end of this extension 34 is supported by a reinforced rubber strap 34', or other suitable suspension means, attached to the harvester combine. An adjustable guide plate 35 (FIG. 1), presently described, may also optionally be mounted on the harvester combine.

As apparent from FIGS. 1 and 2, assuming that the guide plate 35 is not utilized, the chaff from the chaff discharge pan 10 of the harvester combine will drop into the chaff funnel 31 of the blower assembly and then pass down into the interior of the blower housing mainly through the forward half of the circular opening into the blower housing formed by the inner rim of the housing top wall 19; and as also apparent from FIG. 1, the straw discharged from the straw "walker" of the harvester combine will be received mainly by the straw funnel 33 and then pass down into the interior of the blower housing through the rear half of the circular opening into the blower housing formed by the inner rim of the housing top wall 19. Preferably, as an aid in directing the straw and the chaff into their respective funnels and confining them to such funnels, or in order to enable a proportionate amount of straw to be obtained with the chaff, should this be desired, a guide plate 35 (FIG. 1) is mounted to the harvester combine so as to extend downwardly and rearwardly from below the discharging end of the straw "walker." This guide plate 35 is pivotally mounted on the harvester combine at its upper end. The lower end of the guide plate is supported by an adjustable slotted link 35' having a slot engaging a bolt mounted on the harvester combine, the bolt being provided with a suitable clamping nut. Thus the lower end of the guide plate 35 may be positioned directly above the horizontal center line of the opening into the blower, as indicated in full lines in FIG. 1, in which case all the straw will be caused to fall through the upper or rear half of the opening into the blower. When less than the maximum separation of straw and chaff is desired the lower end of the guide plate 35 can be moved into some such position as indicated by the corresponding broken lines in FIG. 1 so as to allow a portion of the straw to pass into the lower or forward half of the opening into the blower for the purpose of eventually being deposited into the forage wagon bin together with the chaff. Thus the guide plate 35 can be employed to achieve a selective metering of the separation of the straw from the chaff.

With the rapid rotation of the impeller in the blower (in clockwise direction as viewed in FIG. 2) the chaff and straw passing down into the blower housing and there engaged by the impeller blades will be forcibly discharged through the passageways 27 and 28, assuming that both passageways are open. However, since the chaff passes into the blower housing mostly through the forward half of the opening into the housing (or the right hand half as viewed in FIG. 2), the tendency will be for this chaff to be discharged through the first passageway in its path, namely passageway 27. On the other hand, since the straw enters into the blower housing mainly through the other half of the circular opening into the housing, the tendency will be for the straw to be discharged mostly through passageway 28 (provided this passageway is open) since the straw will hardly be able to be acted upon by the impeller blades in time to be discharged through the first passageway 27. Consequently in the normal operation of the assembly, and with the second passageway 28 as well as the first passageway 27 open and clear for discharging, most of the chaff will be delivered from the passageway 27 and most of the straw from the passageway 28.

As shown in FIG. 5, the outer end of the top wall of the passageway 28 extends out beyond the outer end of the bottom wall of this passageway, and the two side walls of the passageway terminate in identical arcuate ends curving downwardly from the outer end of the top wall to the outer end of the bottom wall, the arcuate end of the near side wall being shown at 36 in FIG. 5. An adjustable shutter 37 is mounted on the end of the passageway 28. This shutter 37 comprises a curved outer wall 38, the curvature of which conforms to the curvature of the arcuate ends of the side walls of the passageway 28, and a pair of side walls 39 which are pivotally mounted on the top ends of the side walls respectively of the passageway by a pair of hinge pins 40 so as to enable the side walls 39 of the shutter to move on the outside faces of the side walls of the passageway 28 whenever the position of the shutter is adjusted.

A control bar 41 has its outer end pivotally mounted on a side wall 39 of the shutter 37. This control bar is provided with a plurality of apertures for engagement with a bolt 42 secured in a corresponding side wall of the passageway, which bolt carries a suitable wing nut. Thus, by manual adjustment of the control bar 41, the shutter 37 may be set in the middle position shown in full lines in FIG. 5, or in a fully open position, shown in broken lines or in a fully closed position as also shown in broken lines in this figure.

When no separation of the straw from the chaff is desired, and thus when it is desired to collect both straw and chaff in the bin on the forage wagon, the shutter 37 on the end of the passageway 28 is kept closed. As a result, since no discharge takes place out through the passageway 28, both straw and chaff are required to pass out through passageway 27 and thence through the chute 29 for deposit into the forage wagon bin.

The opening of the shutter 37 enables the straw to be discharged through the passageway 28, as previously explained, and thus for the straw to be deposited on the ground. In the event it is desired to scatter the discharged straw broadly over the ground, the shutter 37 is set in the fully open position so as to not to interfere with or exert any directing influence on the path followed by the straw as it leaves the passageway 28. The straw then passes out from the end of the passageway somewhat in the direction indicated by arrow X in FIG. 5, settling on the ground at various distances out from the end of the passageway. In the event it is desired to have the straw deposited in a more compact row on the ground along one side of the path of the combine and forage wagon, then the shutter is set in the intermediate or full line position indicated in FIG. 5. The directs and confines the course of the straw more or less as indicated by the arrow Y in FIG. 5 with the result that the straw is deposited in the desired row along the ground.

Thus, with the blower assembly of the present invention installed on the forage wagon in the arrangement described, a large amount of the straw may be separated out from the chaff and straw as discharged from the harvester combine when this is desired, and further, when such separation is desired, the straw separated out may be scattered broadly over the ground or optionally deposited in a compact row along the side of the path of the combine and forage wagon.

We claim:

1. An improved blower assembly for separately distributing two blower-distributable materials delivered into the blower simultaneously, said assembly comprising a blower housing having bottom, side and top walls, said top wall having a central in-feed opening into said housing, a pair of partially funnel-shaped guideways on said housing having their bottom rims in registration with half portions respectively of the rim of said in-feed opening, and a pair of covered passageways leading outwardly in different directions from said side wall of said housing, said passageways and said guideways so located and positioned that material passing down through one guideway into said housing will be engaged by said impeller in time to be discharged mainly into one of said passageways and material passing down through the other guideway will be engaged by said impeller in time to be discharged mainly into the other of said passageways, whereby the two materials can be separately distributed simultaneously by the same blower.

2. A chaff and straw collecting and separating blower assembly for use behind a harvester combine, said assembly including a blower housing having bottom, side and top walls, said top wall having a central in-feed opening into said housing, a front partially funnel-shaped guideway and an adjoining rear partially funnel-shaped guideway on said housing, said guideways having bottom rims in registration with the front half and the rear half portions of the rim of said in-feed opening respectively, said front guideway adapted to receive the chaff discharge pan on the harvester combine, and said rear guideway similarly adapted to receive the straw from the straw "walker" on the harvester combine when said blower assembly is in proper position behind the harvester combine, a rotating impeller in said housing, a first covered passageway leading rearwardly from said housing, and a second covered passageway leading laterally from said housing and located past said first passageway in the direction of rotation of said impeller, whereby the chaff received into said housing from said front guideway will tend to be discharged through said first passageway and the straw received into said housing from said rear guideway will tend to be discharged through said second passageway as long as both passageways are open.

3. The blower assembly as set forth in claim 2 with the addition of means on said second passageway for restricting the passage of material through said second passageway for the purpose of causing a mixture of chaff and straw to be discharged through said first passageway when desired.

4. The blower assembly as set forth in claim 2 with a hinged shutter on the outer end of said second passageway, said shutter having an outer end wall serving to direct material from said second passageway downwardly to the ground alongside of the path of the harvester combine when said shutter is in partly open position, and with means for manually setting said shutter in closed or open positions.

5. In a combination comprising a harvester combine and a forage wagon connected to the rear of the harvester combine, a chaff and straw collecting and separating blower assembly, said assembly mounted on the front portion of the forage wagon, said assembly including a blower housing having bottom, side and top walls, said top wall having a central in-feed opening into said housing, a front partially funnel-shaped guideway and an adjoining rear partially funnel-shaped guideway on said housing, said guideways having bottom rims in registration with the front half and the rear half portions of said in-feed opening respectively, said front guideway adapted to receive the chaff from the chaff discharge pan on the harvester combine, and said rear guideway similarly adapted to receive the straw from the straw "walker" on the harvester combine, an adjustable guide plate on the harvester combine leading downwardly and rearwardly from beneath the straw "walker" towards said in-feed opening into said blower housing, means for positioning the bottom end of said guide plate with respect to said in-feed opening whereby to aid in controlling the passage of straw and chaff through said guideways respectively, a rotating impeller in said blower housing, a first passageway leading rearwardly from said housing, and a second passageway leading laterally from said housing and located past said first passageway in the direction of rotation of said impeller.

References Cited
UNITED STATES PATENTS

| | | | |
|---|---|---|---|
| 679,048 | 7/1901 | Cole | 302—28 |
| 877,320 | 1/1908 | Gardiner | 302—6 |

ROBERT G. SHERIDAN, *Primary Examiner.*